(12) United States Patent
Chujo et al.

(10) Patent No.: US 6,521,065 B1
(45) Date of Patent: Feb. 18, 2003

(54) METHOD OF APPLYING A MATERIAL TO WIRES OF A WIRE GROUP

(75) Inventors: Hisato Chujo, Yokkaichi (JP); Koshi Abe, Yokkaichi (JP); Hirotaka Baba, Yokkaichi (JP); Kenichi Uchiyama, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 186 days.

(21) Appl. No.: 09/610,127

(22) Filed: Jul. 5, 2000

(30) Foreign Application Priority Data

Jul. 6, 1999 (JP) .......................................... 11-192133

(51) Int. Cl.[7] .............................................. H01B 13/32
(52) U.S. Cl. ............................ 156/51; 156/48; 156/53; 156/192; 29/868
(58) Field of Search ........................... 156/48, 51, 192, 156/293, 575; 174/72 A, 77 R, 152 G; 277/316; 29/868

(56) References Cited

U.S. PATENT DOCUMENTS 6,225,562 B1 * 5/2001 Fujishita ...................... 174/76
6,438,828 B1 * 8/2002 Uchiyama ..................... 29/868

FOREIGN PATENT DOCUMENTS

| JP | 1-149314 | * | 6/1989 | .......... H01B/13/00 |
| JP | 2-15516 | * | 1/1990 | .......... H01B/13/00 |
| JP | 10-135657 A | * | 5/1998 | ............ H05K/7/00 |
| JP | 10-172360 | | 6/1998 | |
| JP | 10-275529 | | 10/1998 | |

* cited by examiner

Primary Examiner—Michael W. Ball
Assistant Examiner—Todd J. Kilkenny
(74) Attorney, Agent, or Firm—Anthony J. Casella; Gerald E. Hespos

(57) ABSTRACT

A sealant applicator 1 is provided for applying a waterproofing treatment to a wire assembly, a plurality of wires are aligned in a line according to their diameters in a holder 4 provided on a wire laying board 3. Positioning members 21 of a main unit 2 are fitted to the holder 4. A pair of nozzles 22 are opposed to each other at the opposite sides of the aligned wires, and is caused to discharge a specified amount of the sealant by a feeding mechanism 26 while being moved in a wire alignment direction by a moving mechanism 27 and being brought closer to the wires by a relatively moving mechanism 25. This enables a variation of clearances between the wires and the nozzles to be reduced and the sealant to be uniformly applied.

7 Claims, 10 Drawing Sheets

METHOD OF APPLYING A MATERIAL TO WIRES OF A WIRE GROUP

FIELD OF THE INVENTION

The present invention relates to a method of waterproofing a group of wires, such as wires of a wiring harness. The wiring harness may be used in an automotive vehicle and may have a grommet mounted on the group of wires. The invention also relates to an applicator for applying a sealant or other material to the wires.

DESCRIPTION OF THE RELATED ART

Many automotive wire assemblies pass through a panel between an engine compartment and a passenger compartment of an automotive vehicle. A tubular rubber grommet often is used in this situation to prevent intrusion of water into the passenger compartment. More particularly, the tubular rubber grommet is fitted in a hole through the panel and the wire assembly is introduced through a hole of the grommet. However, water may flow by capillary action through any clearances that may exist between the respective wires of the wire assembly or between the wires and the grommet.

A sealant has been applied in the clearances inside the grommet to achieve waterproofing between the grommet and the wires of the wire assembly. However, the application of a waterproofing sealant to the wires and the grommet has not been easy.

Another waterproofing method applies a sealant to the respective wires. The wires then are wrapped with a film and are bundled with tape to achieve a circular cross section. The bundled wires then are fitted into the grommet. This method enables the waterproofing sealant to be applied when the wire assembly is manufactured. Accordingly, the waterproofing process can be simplified and speeded up. For example, a plurality of wires for a wire assembly can be arranged in a line. Nozzles are provided at opposite sides of this wire group, and a sealant is discharged simultaneously from the nozzles for application to opposite sides of the wire group (see, for example, Japanese Unexamined Patent Publication No. 10-172360). More particularly, a U-shaped nozzle holder is provided with fixed arms that are spaced apart sufficiently to be disposed on opposite sides of the wire group. The nozzles are mounted in the arms of the U-shaped holder, such that a nozzle in one arm faces a nozzle in the other arm with a fixed spacing between the opposed nozzles. The wires of the wire group are positioned between the arms of the U-shaped holder. Thus, the nozzles are arranged along opposite sides of the wire group in a direction in which the wires are aligned, so that the sealant can be applied simultaneously to the opposite sides of the wire group.

The above-described arrangement of nozzles cannot apply a uniformly thick layer of sealant to both thick wires and thin wires of a wire assembly. More particularly, if the aforementioned constant spacing between the opposed nozzles is set at a value suitable for the thicker wires, then the clearances between the thinner wires and the nozzles are larger than a suitable value. As a result, the sealant must be discharged from the nozzles for a long time to achieve a specified thickness of sealant on the thinner wires. However, this longer application of the sealant causes thicker layers of the sealant on the thicker wires. Conversely, if an attempt is made to achieve a proper application of the sealant to the thicker wires, then the sealant on the thinner wires will not be sufficiently thick. In either case, the thickness of the sealant cannot be uniform on all wires in the assembly produced by the prior art apparatus.

Specifications exist for the thickness of the sealant on wires in a wire assembly, and the specifications vary depending on the type of automotive vehicle. The aforementioned fixed nozzles cannot accommodate the various specifications.

An object of the present invention is to provide a method, which can be carried out when a wire assembly is manufactured, for applying a uniformly thick layer of material to wires in a wire assembly in accordance with the specification of the wire assembly. Another object of the invention is to provide an applicator for this purpose.

SUMMARY OF THE INVENTION

The subject invention is directed to a method for applying a material to wires of a wire assembly. The material may be a sealant that has a specified viscosity. The method comprises a first step of aligning wires of a wire group substantially side by side. The method further comprises providing a pair of nozzles for discharging the material. The nozzles are positioned substantially opposed to each other, and the aligned wires are held or positioned the substantially between the opposed nozzles. The method proceeds by moving the nozzles in a wire alignment direction while changing the spacing between the pair of nozzles according to the diameters of the wires so as to cause the material to be applied to and/or to penetrated between the wires.

According to a preferred embodiment, the aligning step comprises aligning the wires according to their diameter, such that the diameters thereof increase in the wire alignment direction.

The moving step may comprise reducing the spacing of the nozzles when the nozzles reach a position along the wire alignment direction corresponding to a clearance between adjacent wires. Alternatively, the discharge of material may be reduced or stopped when the nozzles align with a clearance between adjacent wires.

As a further aspect of the invention, the moving speed of the nozzles along the wire alignment direction may be varied to change the discharge of material onto the wires. Additionally, the rate of discharge of the material may be changed.

The method may be carried out during the manufacturing of a wire assembly, and specifically may be carried out to waterproof a wire assembly that is to be introduced into a grommet. Accordingly, the material applied to the wires may be a sealant that has a specified viscosity. A group of wires of the wire assembly are aligned substantially side-by-side before applying the sealant. The sealant then may be applied by a pair of opposed nozzles disposed on opposite sides of the wire group. The nozzles may be moved in a wire alignment direction, while the spacing between the nozzles is changed according to the diameters of the wires. The application of the sealant is carried out to cause the sealant to penetrate between the wires. A film then is wrapped around a portion of the wire group to which the sealant had been applied, such that the wrapped wire group has a substantially circular cross section. Tape then is applied to at least part of the outer surface of the film.

The above-described movement of the nozzles in the wire alignment direction while causing the nozzles to discharge the sealant, enables the sealant to be applied simultaneously to opposite sides of an area extending over the plurality of wires while penetrating between the wires. This waterproofing treatment is applied during the manufacturing of the wire assembly, and hence the waterproofing process can be simplified and speeded up.

Additionally, the spacing between the pair of nozzles is adjusted according to the diameters of the wires. Consequently, a variation of the clearances between the nozzles and the respective wires when the nozzles are moved in the wire alignment direction can be reduced. As a result, the sealant can be applied uniformly to the entire opposite sides of the wire group in a uniform thickness. Further, wire groups made of wires that have different diameters can be accommodated.

The invention also is directed to an applicator, such as an applicator that can be used in the above described application method. The applicator comprises a pair of nozzles that are substantially opposed to each other on opposite sides of a holder for holding or positioning a wire group. The wire group comprises a plurality of wires that are aligned in a wire alignment direction, such that at least portions of the respective wires are laterally disposed relative to one another. The nozzles are provided for discharging a material, such as a sealant that has a specified viscosity. The applicator further comprises a moving mechanism for moving the pair of nozzles in the wire alignment direction, which is a direction transverse to the individual wires. A feeding mechanism is provided for feeding the material to the nozzles so that a specified amount of the material is discharged from the nozzles. The applicator also comprises a moving means for moving the nozzles toward and away from each other so that the spacing between the pair of nozzles corresponds to the diameter of the wires held between the nozzles.

With this applicator the nozzles are moved in the wire alignment direction while the spacing between the nozzles is changed according to the diameters of the wires. During that time, the specified amount of sealant can be discharged from the nozzles.

The holder preferably is formed such that the wires in the wire group are aligned substantially in the order of their diameters. Wires with the smallest diameters preferably are arranged in a bottommost position as seen in a direction of insertion of the wires into the holder. Additionally, the nozzles are moved while tightly holding the wires in the holder between the nozzles. With this construction, since the nozzles hold the wire group in the holder, the aforementioned spacing with the nozzles and each wire can be minimized easily despite the flexibility of the wires. Thus the sealant applicator can have a simple construction.

Further, since the wires are aligned in the order of their diameters, the nozzles are easily accessible to the respective wires. This is because, if a thinner wire is aligned between thicker wires, it may be difficult for the nozzles to approach this thinner wire. Accordingly, the variation of the above clearance can be reduced, which is preferable to apply the sealant uniformly.

Here, the alignment according to the diameters of the wires includes, for example, an alignment of wires having only slightly different diameters regardless of their diameters in addition to an alignment of wires from the thickest one to the thinnest one.

The nozzles preferably are controlled to stop discharging material at a predetermined timing while the nozzles are moved by the moving mechanism along the wire alignment direction. With this construction, the discharge of the sealant can be stopped if there is a clearance between the aligned wires The feeding mechanism comprises a source of the material to be applied. The sealant may be a cartridge including a tube that contains the material. An outlet is provided at one end of the tube for discharging the material. A bottom lid is movable inside the tube substantially along the longitudinal direction of the tube. The bottom may be pushed from the other end of the tube to discharge the material. One end of the cartridge can be attached to and removed from a mount portion by moving the cartridge substantially along its longitudinal direction. A pushing bar is provided with an end that can contact the bottom lid of the cartridge attached to the mount portion. A movable member is attachable to and detachable from the other end of the pushing bar and is movable substantially along the longitudinal direction of the cartridge. A permanent magnet may be provided for creating a magnetic attraction that will hold the other end of the pushing bar in or on the movable member.

With this construction, when the cartridge is attached or detached, the movable member is moved away from the mount portion and the pushing bar is detached from the movable member. In this state, the cartridge can be attached or detached easily without interference by the pushing bar.

After the attachment of the cartridge, the movable member holds the pushing bar and is moved toward the mount portion. Then, the bottom lid of the cartridge is pushed by the pushing bar, thereby causing the sealant to discharge through the outlet of the cartridge.

Further, by utilizing the magnetic attraction of the magnet to hold the pushing bar, the pushing bar easily can be attached to and detached from the movable member only by arranging the other end of the pushing bar at the movable member.

These and other objects, features and advantages of the present invention will become apparent upon a reading of the following detailed description and accompanying drawings.

DESCRIPTION OF THE PREFERRED EMBODIMENTS

Figure 1:
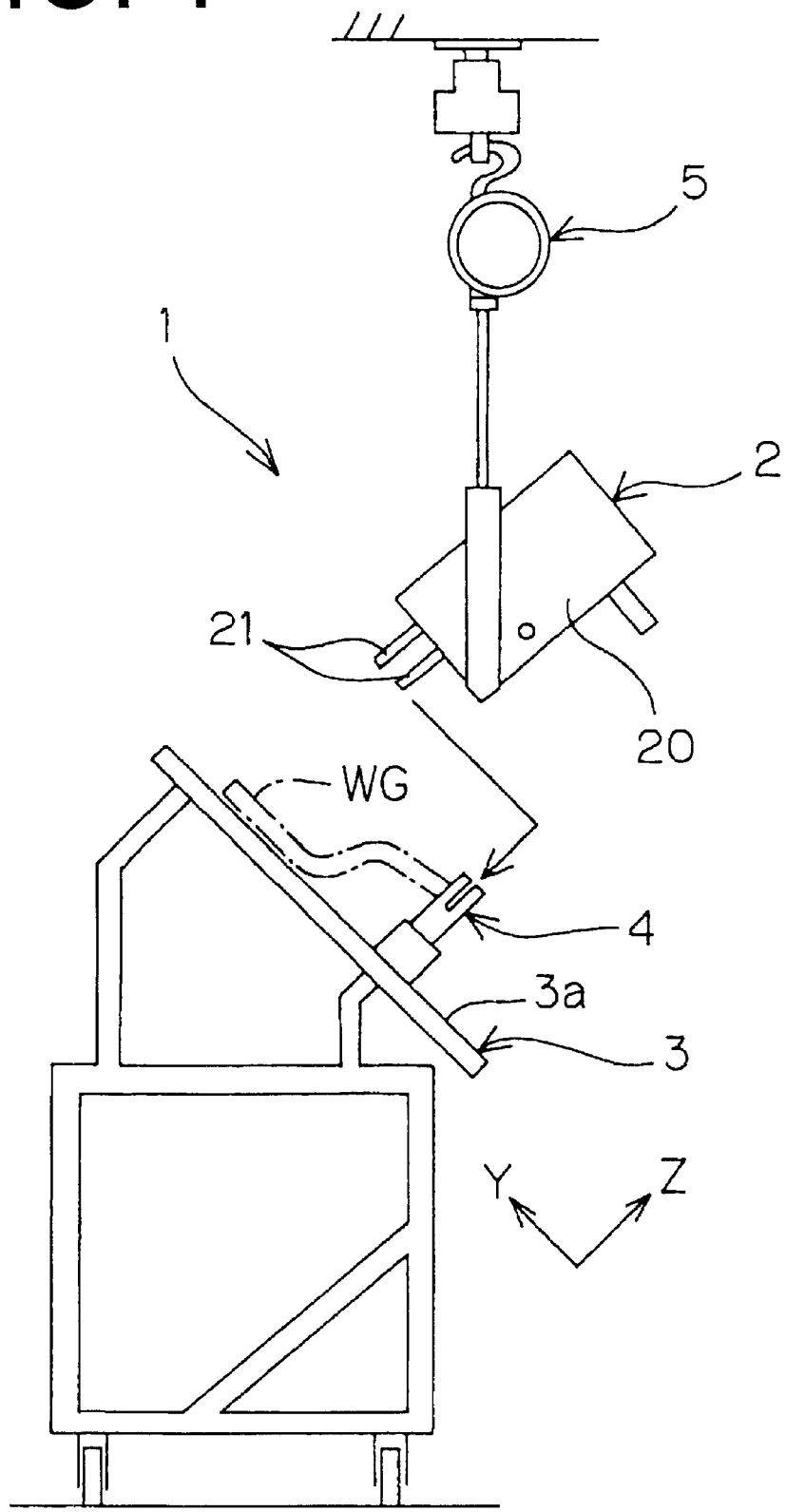
FIG. 1 is a schematic side view showing a sealant applicator according to one embodiment of the invention, a wire laying board and other parts in their used states.

A sealant applicator in accordance with the subject invention is identified generally by the numeral 1 in FIG. 1.

However, it should be understood that a material other than a sealant may be dispensed by the applicator. Thus, any other material that is to be applied to wires and/or introduced into clearances between adjacent wires may be applied by the applicator 1. Other materials could be glue, a conductive material or a vibration dampening material, to name a few.

The applicator 1 is comprised of a main unit 2, a wire laying board 3 and a holder 4. The main unit 2 is suspended e.g. from the ceiling via a balancing or suspension mechanism 5. The wire laying board 3 is located substantially below the main unit 2 for holding an entire wire group WG, and the holder 4 is provided on the wire laying board 3 for holding a waterproofing or sealing or connecting or application area of the wire group WG. Wires can be laid on the wire laying board 3 to form a wire assembly, and the entire wire assembly is held on the wire laying board 3. The holder 4 also is used to hold or position the wire group WG in a specified position when the wire assembly is manufactured.

Figure 4:
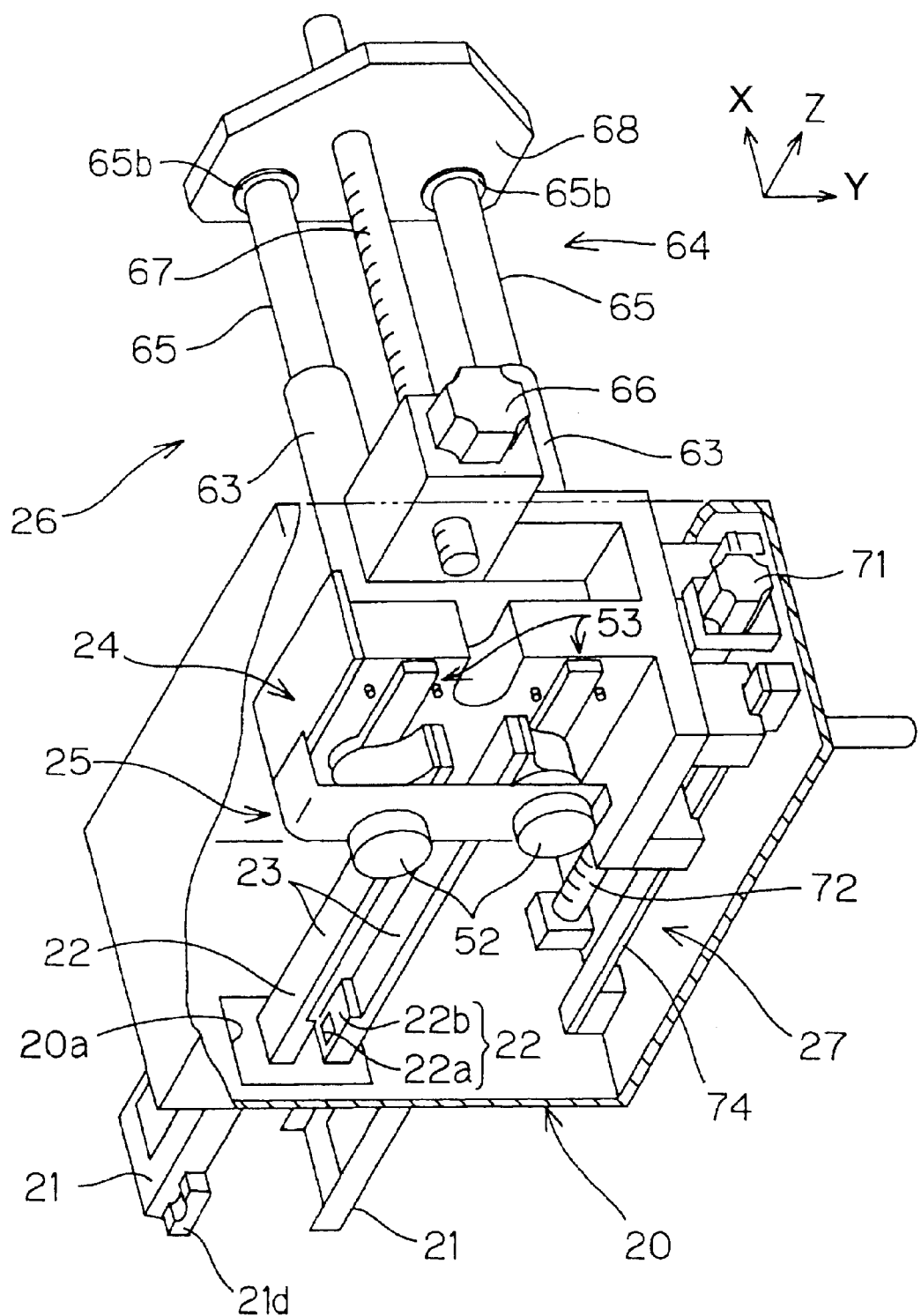
FIG. 4 is a perspective view partly in section showing the sealant applicator shown in FIG. 1.

The holder 4 of the applicator 1 positions the wire group WG, and the main unit 2 is positioned manually in proximity to the holder 4. A sealant with a specified viscosity then is applied by nozzles 22 of the main unit 2 to the section of the wire group WG held by the holder 4, as shown in FIG. 4. The viscosity of the sealant or other material discharged from the nozzles 22 may be chosen such that the sealant or other material may be attached or adhered to the wires without dripping from the wires.

In the present invention, a plurality of wires W are aligned substantially in a line in the holder 4, and the sealant is applied continuously to the wires W along a wire alignment direction by the main unit 2.

Figure 2:
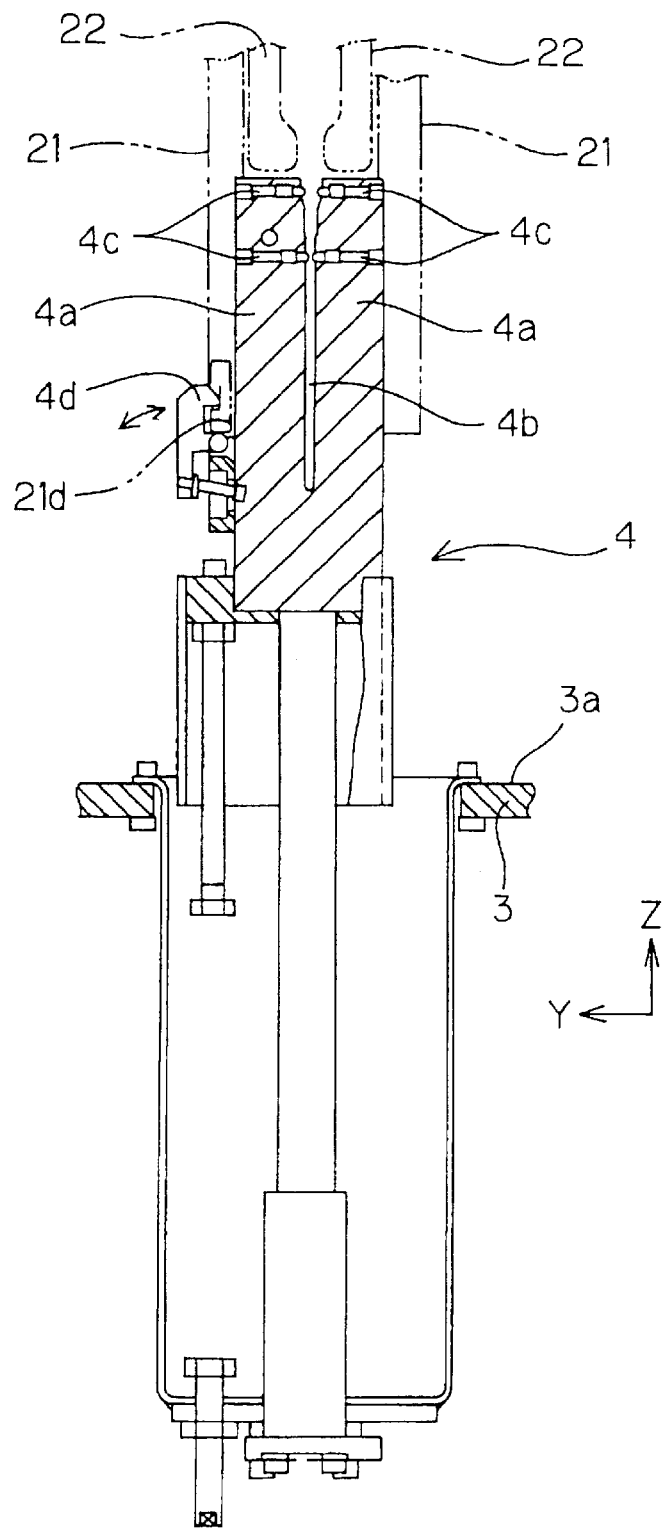
FIG. 2 is a partial section of a holder shown in FIG. 1.

The holder 4 can be projected and retracted along a direction substantially normal to a surface 3a of the wire laying board 3, as shown in FIG. 2. More particularly, the holder 4 can lift the wire group WG from the surface 3a for efficient application of the sealant. On the other hand, the holder 4 releases the wire group WG in a position proximate to the surface 3a.

Figure 3:
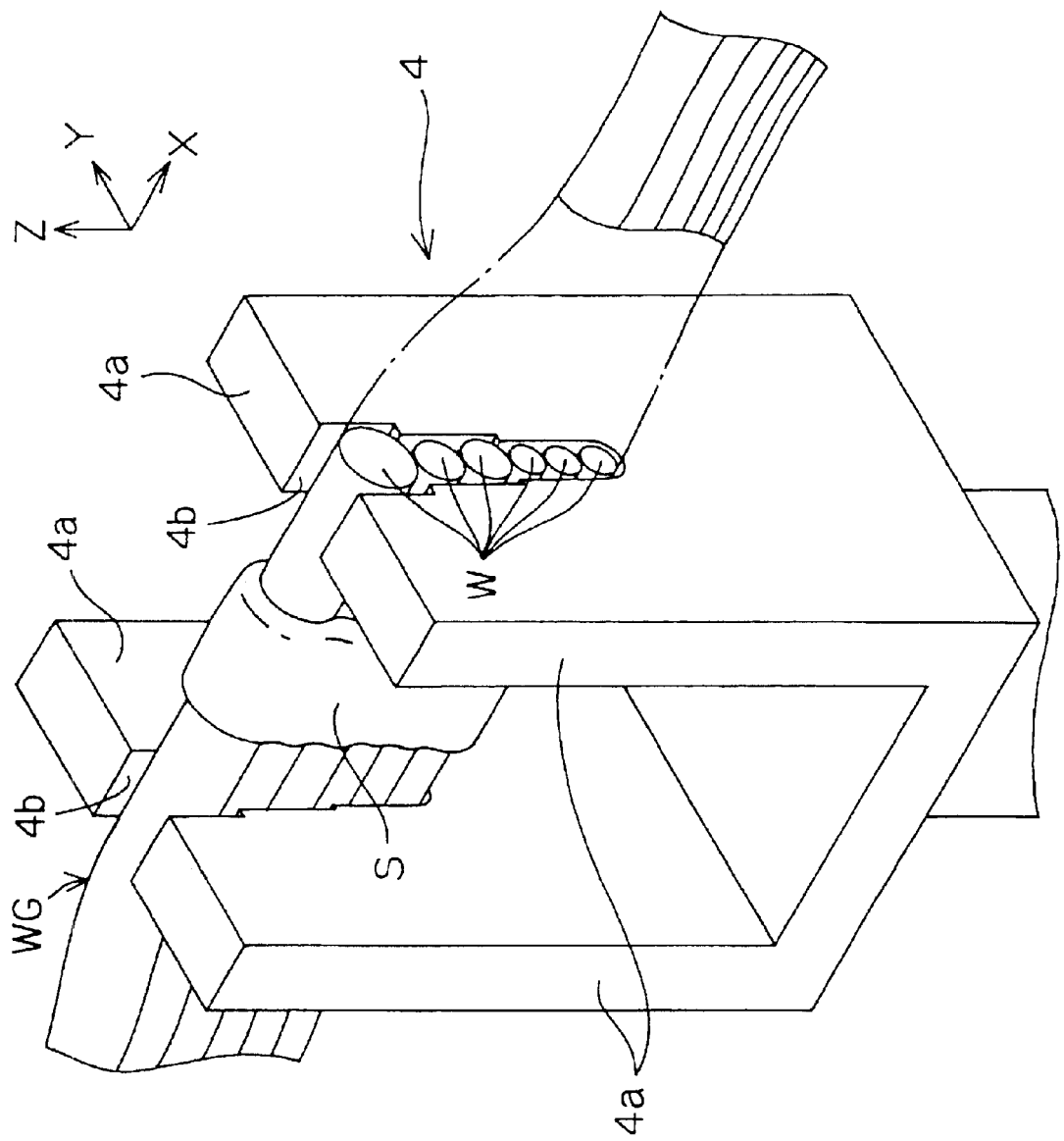
FIG. 3 is a perspective view showing the holder shown in FIG. 2 and a wire group held by the holder in a state where a sealant is applied.

The holder 4 has two pairs of opposing members 4a. Each pair of the opposing members 4a extends substantially normal to the surface 3a of the wire laying board 3, such that a groove 4b is defined between the opposing members 4a for holding or positioning the wire group WG therein. As shown in FIG. 3, the respective pairs of the opposing members 4a are spaced apart by a specified distance in the extension of the wires, and a waterproofing area for the application of the sealant S to the wire group WG is defined in this spacing.

Each groove 4b extends substantially in a depth direction, as indicated by arrow Z in FIG. 3. More particularly, each groove 4b extends substantially normal to the surface 3a of the wire laying board 3, and an end of each groove 4b distal from the surface 3a along the depth direction is open. Each groove 4b also is open in a direction of extension of the wires W, which preferably is a direction substantially parallel to the surface 3a. The grooves 4b define widths that differ stepwise along the depth direction. Thus, each groove 4b is wider toward the entrance of the groove 4b. The wires W are aligned one by one in the depth direction of the groove 4b such that thinner wires are located at the bottom of the groove 4b and thicker wires are located at the entrance of the groove 4b. Ball plungers 4c are provided near the entrance of the groove 4b and at a boundary between the narrower part and the wider part of the groove 4b, as shown in FIG. 2. Balls provided at the leading ends of the ball plungers 4c are biased elastically to project into the groove 4b, thereby positioning and/or preventing the wires W below the balls from inadvertently coming out of the groove 4b.

The main unit 2, as shown in FIG. 1, is comprised of a suspended frame 20, which forms the outer configuration of the main unit 2, and a pair of spaced-apart opposed positioning members 21 for positioning the frame 20 with respect to the holder 4. As shown in FIG. 2, the holder 4 is fitted or inserted at least partly between the positioning members 21 to introduce the wires W. In this state, a recess-shaped hook 21d on the positioning member 21 and a hook 4d on the holder 4 engage with each other to hold or lock the positioning member 21 and the holder 4 together. Bearing guide members (not shown) preferably are on and/or along the positioning member 21 for reducing friction and/or abrasion between the positioning member 21 and the holder 4.

The following description is based on a state where the main unit 2 and the holder 4 are locked together. For this description, the direction in which the wires W are aligned is referred to as an application direction or a wire alignment direction (arrow Z); the extension of the wires W is referred to as a wire direction (arrow X); and a direction normal to both the wire direction and the application direction and in which the wires W are held is referred to as a holding direction (arrow Y). The above-referenced arrows are shown in the respective drawings.

The frame 20 is substantially box-shaped, as shown in a perspective view of FIG. 4, and has an opening 20a in one surface thereof. The aforementioned positioning members 21 extend substantially side-by-side in the holding direction near the periphery of the opening 20a. Two nozzles 22 are provided for discharging the sealant or other viscous material and are disposed in proximity to the opening 20a. The nozzles 22 are opposed to each other substantially in the holding direction, and are provided respectively at the leading ends of a pair of arms 23. The other ends of the respective arms 23 are supported for movement and/or rotation on a movable element 24, which is provided with a relatively moving mechanism 25 for moving and/or rotating the other ends of the arms 23 toward and away from each other. Accordingly, varying the space between the leading ends of the arms 23 will change the space between the nozzles 22. The movable element 24 is provided with a feeding mechanism 26 for feeding the sealant or other material to the pair of the nozzles 22.

Figure 5:
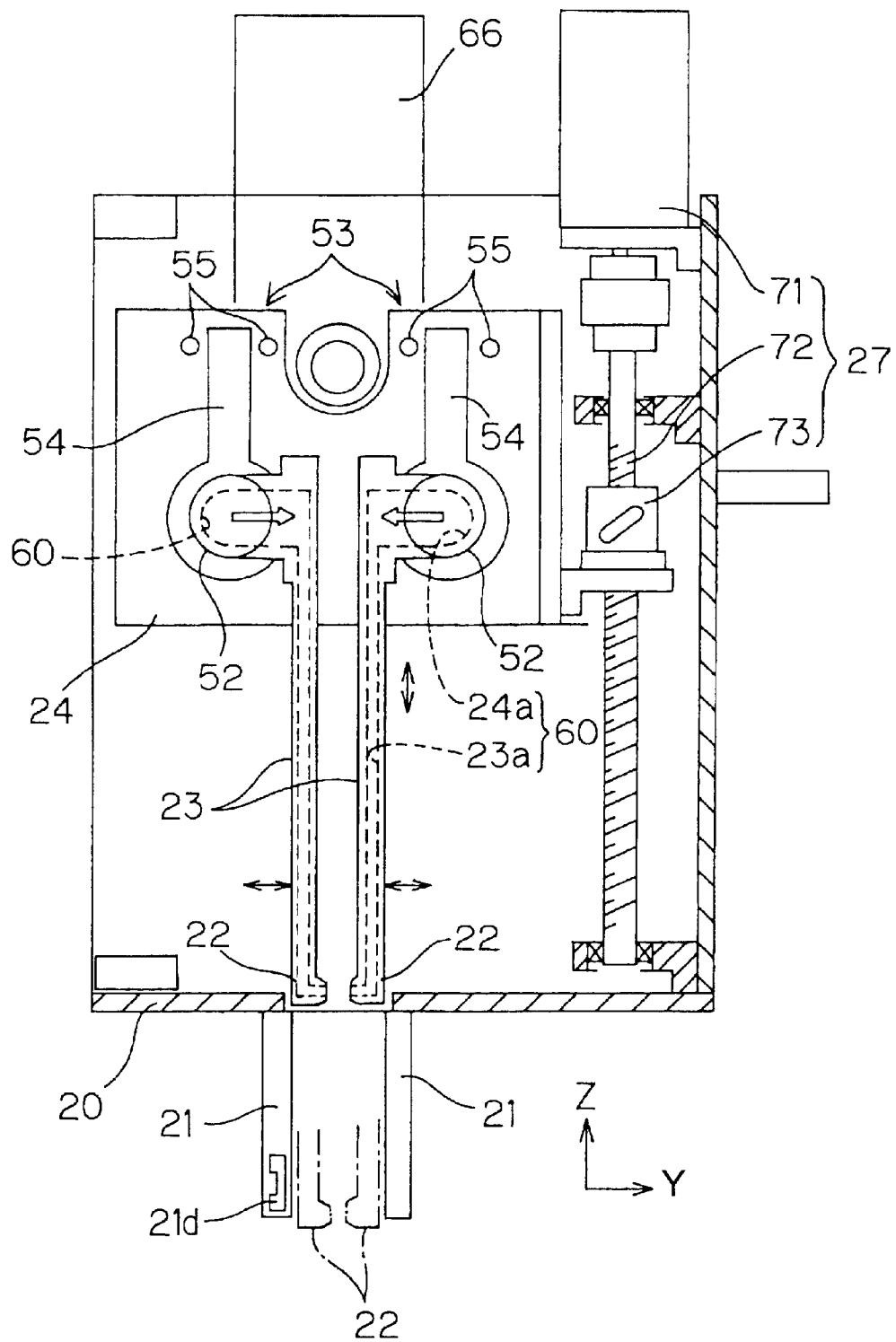
FIG. 5 is a side view of the sealant applicator shown in FIG. 4.

A moving mechanism 27 for moving the movable element 24 is provided in the frame 20, and is shown in greater detail in FIGS. 4 and 5. More particularly, the moving mechanism 27 includes a motor 71 secured to the frame 20. A ball screw 72 is coupled to and driven by a shaft of the motor 71, and extends in the application direction (Z). A nut 73 is screwed onto the ball screw 72 and is fixed to the movable element 24. The moving mechanism 27 also includes a direct-acting bearing 74 for movably bearing the movable element 24 along the application direction. The moving mechanism 27 moves the feeding mechanism 26, the relatively moving mechanism 25, the pair of arms 23 and the nozzles 22 together with the movable element 24. The moving mechanism 27 can cause the leading ends of the arms 23 to project out of the frame 20 through the opening 20a by moving the movable element 24 in the application direction (Z). The moving mechanism 27 also can move the nozzles 22 along the wire aligning direction (Z) while the leading ends of the arms 23 project out of the frame 20, as shown in phantom line in FIG. 5.

Figure 6:
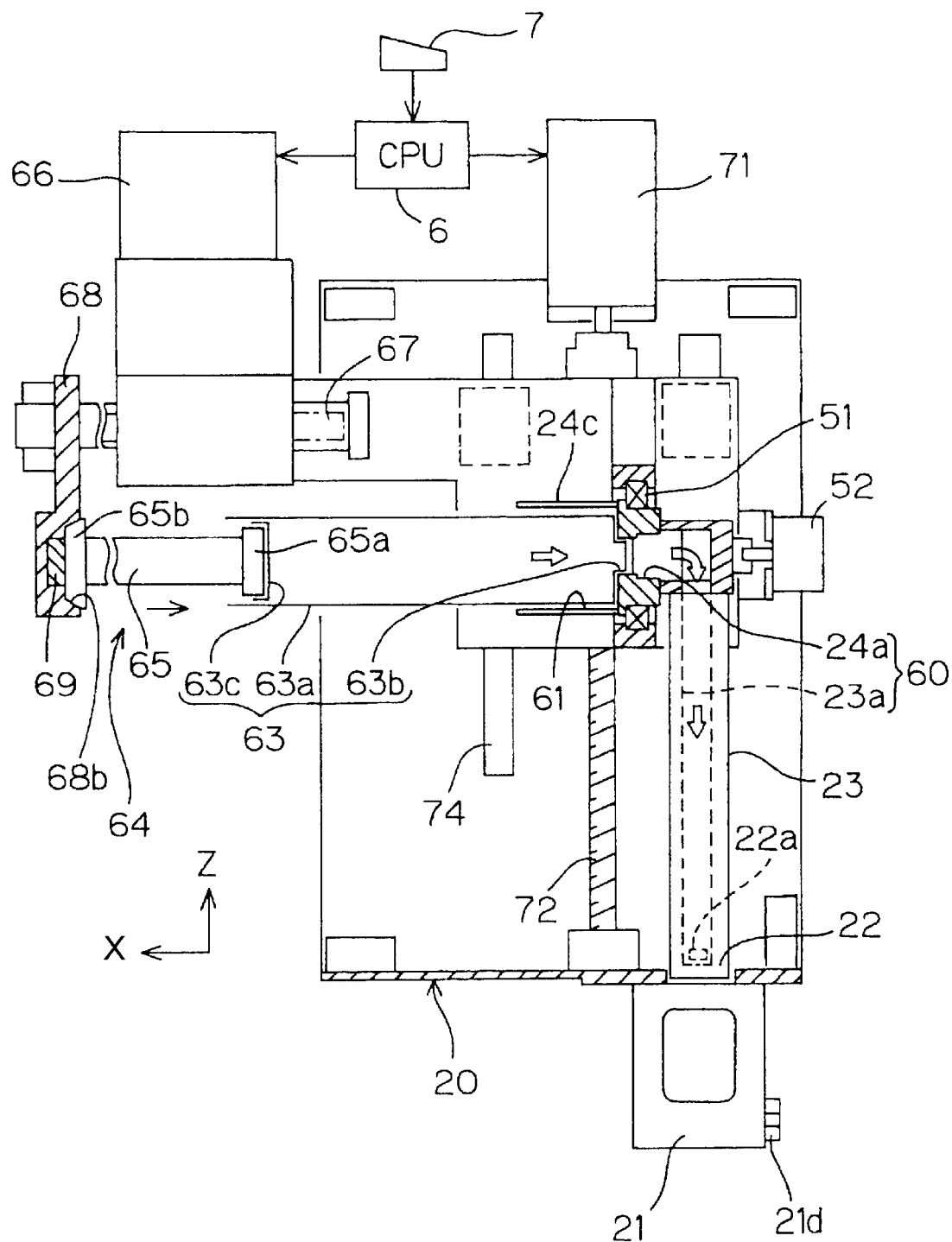
FIG. 6 is a front view of the sealant applicator shown in FIG. 1.

The relatively moving mechanism 25 is comprised of bearings 51 for bearing the other ends of the arms 23 for rotation about a center axis of rotation that extends along the wire direction X, as shown in FIG. 6. The relatively moving mechanism 25 also includes air-pressure actuators 52, which function as driving sources or actuating means for rotating the arms 23. Restricting mechanisms 53 are provided for restricting angles of rotation of the arms 23. One or more step motors or other actuating means may be used to rotate or pivot the arms 23 instead of or in addition to the air pressure actuators 52. Each restricting mechanism 53 includes an arm member 54 at the other end of the corresponding arm 23 and a pair of pins 55 on the movable element 24. The opposite sides of the arm member 54 contact the pins 55 at the opposite ends of a range of rotation for the corresponding arm 23. The above parts are provided for each of the arms 23. The air pressure actuator 52 is shown in spaced relationship to the restricting mechanism 53 along the axis of rotation. However, it may be positioned laterally to the restricting mechanism 53. That is, the air pressure actuator 52 may be spaced radially from the axis of rotation of the restricting mechanism 53. Thus the air pressure actuator 52 and the restricting mechanism 53 may be provided on substantially the same plane and adjacent each other.

The air-pressure actuators 52 of the relatively moving mechanism 25 bias the respective arms 23 in opposite rotating directions. Biasing forces act substantially constantly in directions for closing the arms 23, and thus bringing the nozzles 22 closer to each other. When the sealant is discharged from the nozzles 22, the respective nozzles 22 and the respective wires can be spaced apart by a substantially constant distance even if the wires W have different diameters by balancing a pressure at which the sealant is discharged and the aforementioned biasing forces. As a result, the sealant can be applied substantially uniformly to the wires W in a specified thickness.

Each arm 23 has a substantially hollow structure so that the sealant can be introduced to the corresponding nozzle 22. An internal chamber 23a of the arm 23 communicates with a hole 24a in the movable element 24 and with the nozzle 22 at the leading end of the arm 23, as shown in FIG. 6.

Each nozzle 22 includes one discharge opening 22a through which the sealant is discharged. A guide portion 22b is formed in the vicinity of the respective discharge opening 22a and can extend at least partly along the wires W. The discharge openings 22a and the guide portions 22b of the respective nozzles 22 are opposed to each other.

Each guide portion 22b is integrally formed with a member that defines the periphery of the corresponding discharging opening 22a and that extends substantially parallel to the wire direction and the application direction (Z). A section of the guide portion that is located more toward the other end of the arm 23 than the discharging opening 22a is inclined along the application direction (Z).

The discharging opening 22a preferably has a substantially rectangular shape, which is long in the wire direction, and a longitudinal dimension that is set at the length of the waterproofing area.

The feeding mechanism 26 includes feeding paths 60 comprised of the inner chambers 23a of the arms 23 and the holes 24a of the movable element 24, as shown in FIG. 6. Recess-shaped mount portions 61 each are located at an end of the corresponding feeding path 60 for detachably mounting one end of a corresponding cartridge 63. An extruding mechanism 64 is provided for extruding the sealant or other material to the feeding paths 60 from the cartridges 63 that are attached to the mount portions 61. The feeding path 60, the mount portion 61 and the cartridge 63 are provided for each of the pair of nozzles 22, whereas an essential portion of the extruding mechanism 64 is used for both nozzles 22.

Each cartridge 63 includes a tube 63a that is elongated in one direction, and that accommodates the sealant or other extrudable or applicable material. A small-diameter portion 63b is located at one end of the tube 63a and has an outlet. A bottom lid 63c is fitted movably into the tube 63a along the longitudinal direction of the tube 63a for extruding the sealant inside the tube 63a. With the cartridge 63 attached to the mount portion 61, one end 65a of a pushing bar 65 of the extruding mechanism 64 is pressed against the bottom lid 63c of the cartridge 63. When the bottom lid 63c is pushed toward the small-diameter portion 63b along the longitudinal direction (arrow X) of the tube 63a from the other end of the tube 63a, the sealant in the tube 63a can be extruded through the outlet.

Each mount portion 61 includes a retaining tube 24c on the movable element 24 and an internally threaded portion formed in the inner surface of the hole 24a. The cartridge 63 is attached to or detached from the mount portion 61 by moving the cartridge 63 along its longitudinal direction to insert or withdraw an end of the cartridge 63 toward the small-diameter portion 63b into or from the retaining tube 24c.

The extruding mechanism 64 includes the pushing bars 65 that extend in the longitudinal direction of the tube 63a of the cartridge 63. A stepping motor 66 secured to the movable element 24 functions as a driving source for moving the pushing bars 65. The extruding mechanism 64 also includes a direct-acting shaft 67, which is moved linearly upon receiving the torque of a shaft of the motor 66 via a rack-pinion mechanism or the like, and a coupling member 68 for coupling an end of the direct-acting shaft 67 to the other ends of the pushing bars 65.

The coupling member 68 acts as a movable member, which is detachably attached to the other ends 65b of the pushing bars 65 and is moved along the longitudinal direction of the tube 63a by the direct-acting shaft 67 to push the bottom lids 63c via the pushing bars 65. The coupling member 68 is movable between a first position near the mount portions 61 and a second position distant from the mount portions 61. The first position corresponds to a state where the bottom lid 63c of each cartridge 63 is substantially in a bottommost position of the tube 63a, and the second position corresponds to a state where the bottom lid 63c of each cartridge 63 not being used and the pushing bars 65 do not strike against each other. The coupling member 68 is formed with recesses 68b that face the mount portions 61, and permanent magnets 69 are fixed at the bottom of the recesses 68b. The other end 65b of each pushing bar 65 includes a magnetic element which interacts with the corresponding permanent magnet 69 to create a magnetic attraction between the permanent magnet 69 and the other end 65b. Thus, when the other end 65b of the pushing bar 65 is fitted in the recess 68b, the pushing bar 65 is held in the recess 68b.

Each recess 68b has a slanted surface such that the entrance is wider than the bottom. The pushing bar 65 is detached from the recess 68b as follows. By laying the other end 65a of the pushing bar 65 along the slanted surface, the pushing bar 65 can be moved in a direction normal to the direction of magnetic attraction, and the other end 65b of the pushing bar 65 can be detached easily from the recess 68b against the magnetic attraction of the permanent magnet 69. When the pushing bar 65 is to be mounted in the recess 68b, the other end 65b of the pushing bar 65 is aligned along the slanted surface and is guided. Thus the pushing bar 65 easily can be positioned concentrically with the recess 68b.

The stepping motor 66 of the feeding mechanism 26 can be driven such that the bottom lids 63c of the cartridges 63 are pushed via the direct-acting shaft 67. As a result, the coupling member 68 and the pushing bars 65 move toward the small-diameter portions 63b of the cartridges 63 along the wire direction (longitudinal direction of the cartridges 63). In this way, the sealant is extruded into the holes 24a of the movable element 24 from the cartridges 63. The feeding paths 60 normally are filled with the sealant that has already been fed. Consequently, the sealant in the feeding paths 60 is pushed and discharged from the nozzles 22 while upstream sealant is extruded into the hole 24a from the cartridges 63. Further, the stepping motor 66 is driven at a predetermined rotational speed, which is set to correspond to or yield a discharged amount of the sealant per unit time (discharging speed). The preceding description relates to an apparatus with two cartridges 63. However a single cartridge 63 may be provided for feeding the sealant or other such material to the discharge nozzles 22. This optional embodiment would require a suitable branching or interconnection between the single cartridge 63 and the nozzles 22 to feed the sealant or other material to the nozzles 22. The single cartridge would decrease the overall size and weight of the apparatus, and thereby would improve operability. Moreover, only a single actuating mechanism, such as the pushing bar 65, is needed for the single cartridge 63.

Figure 7:
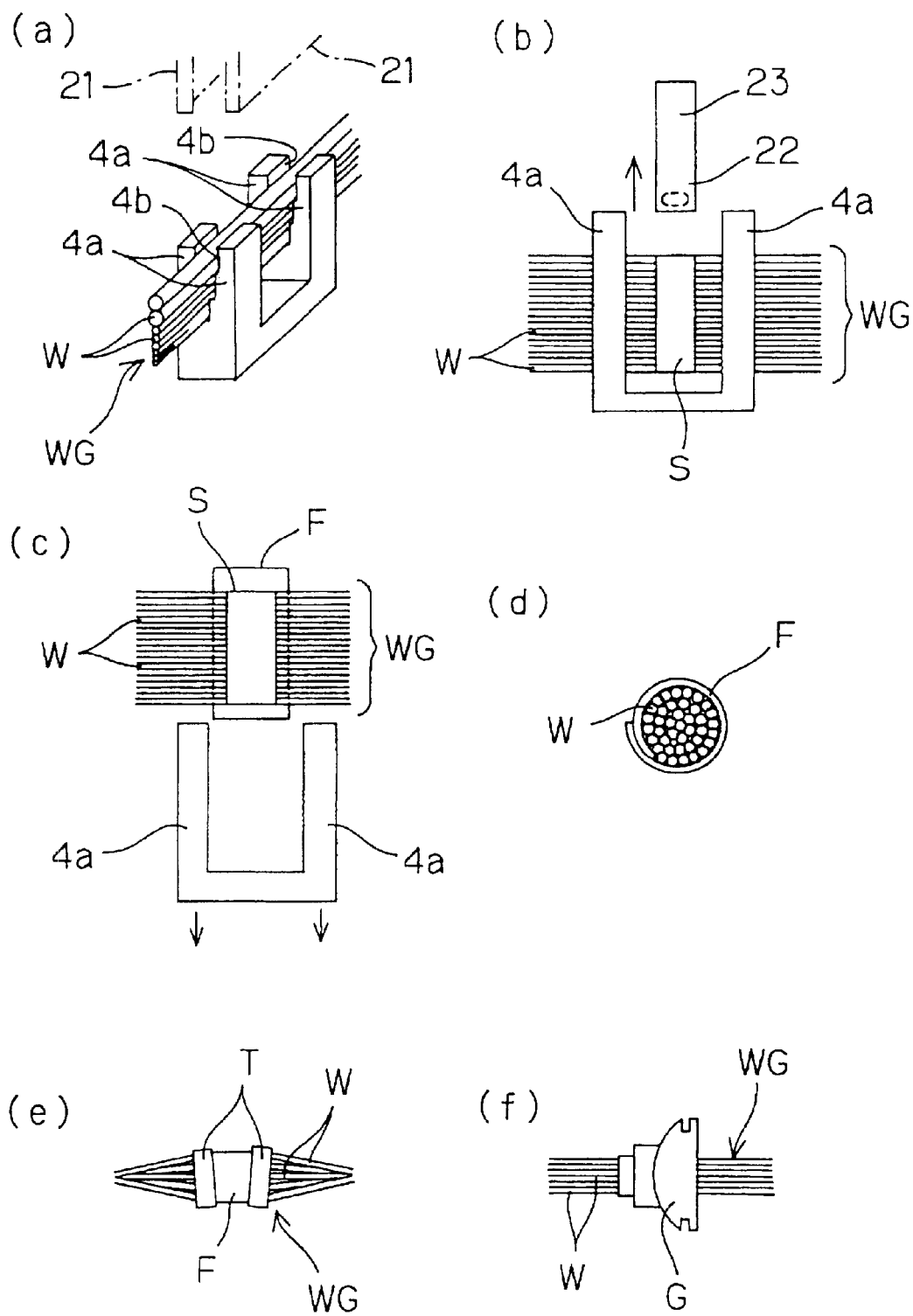
FIGS. 7(a) to 7(f) are diagrams showing an inventive waterproofing method step by step.
Figure 8:
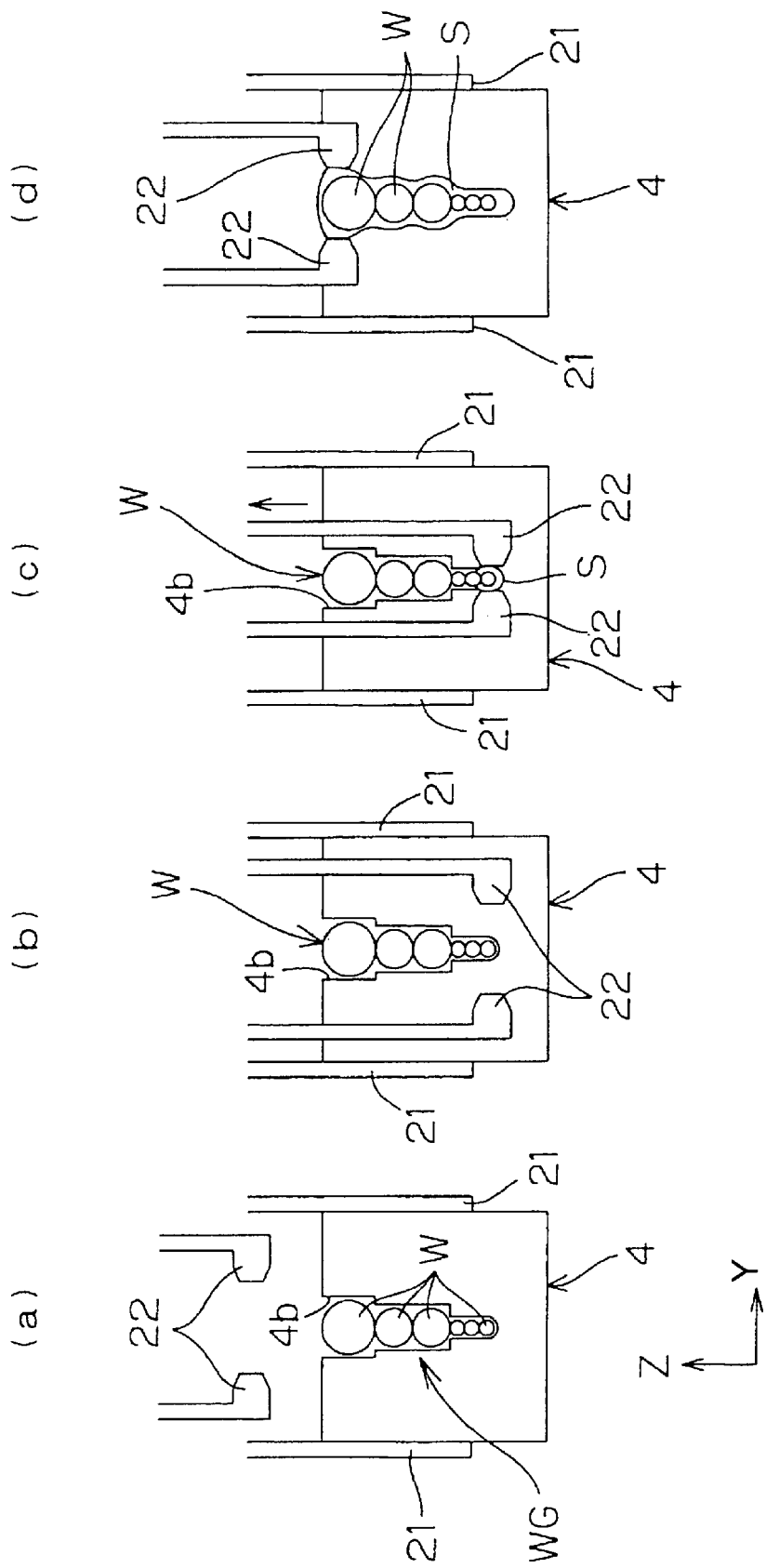
FIGS. 8(a) to 8(d) are side views showing the holder, nozzles, the wire group to explain an operation of the sealant applicator shown in FIG. 1.

Next, a waterproofing method of the invention is described with reference to FIGS. 7 and 8.

First, as shown in FIG. 7(a), the respective wires W of the wire group WG are introduced into the grooves 4b of the holder 4 to substantially align the wires W in a line. More particularly, as shown in FIG. 3, the wires W are aligned such that the thinner wires are located at the bottom of the grooves 4b and thicker wires are located at the entrance side of the grooves 4b.

As shown in FIG. 8(a), the positioning members 21 of the main unit 2 are fitted into the holder 4 to position the wire group WG and the main unit 2 with respect to each other.

Next, as shown in FIG. 8(b), the nozzles 22 in the main unit 2 are moved to their widest spacing by the relatively moving mechanism 25. Additionally, the leading ends of the arm 23 are caused to project through the opening 20a by the moving mechanism 27 to locate the nozzles 22 at a position substantially facing the wire located at the bottom of the grooves 4b.

As shown in FIG. 8(c), the spacing between the nozzles 22 in the main unit 2 is narrowed by the relatively moving mechanism 25 to bring the nozzles 22 at least partly into contact with the wires W. Accordingly, the wires W are positioned and/or at least partly held between portions of the nozzles 22. Subsequently, the feeding mechanism 26 causes the pair of nozzles 22 to discharge the sealant S or other material. Synchronously, the nozzles 22 are moved in the application direction by the moving mechanism 27.

The nozzles 22 apply the sealant S from the opposite sides of the aligned wires W in a manner to fill the sealant S into clearances between the wires W and/or to at least partly coat outer portions of the wires with the sealant S.

As the pair of nozzles 22 are moved in the application direction Z by the moving mechanism 27, the guide portions 22b of the nozzles 22 move along the wires W, thereby guiding the discharging openings 22a according to the diameters of the wires W. The nozzles 22 preferably are moved in the application direction at a predetermined constant speed, and a specified amount of the sealant S is discharged from the nozzles 22 by the feeding mechanism 26 at a corresponding constant speed. In this way, the sealant or other material is applied uniformly in the application or waterproofing area.

The feeding mechanism 26 is stopped when the nozzles 22 reach the end of the aligned wires W as shown in FIG. 8(d), thereby completing the application of the sealant S.

As a result, the sealant S is applied entirely to the opposite sides of the wires W of the wire group WG in the waterproofing area as shown in FIG. 7(b).

The holder 4 is lowered as shown in FIG. 7(c) to take the wire group WG to which the sealant S was applied out of the grooves 4b and to release the wire group WG.

As shown in FIG. 7(d), a resin sheet F can be wrapped around a portion of the wire group WG to which the sealant S was applied, and then the wire group WG is rearranged in the sheet F to have a circular cross section.

Tapes T then can be wound around the outer surface of the sheet F as shown in FIG. 7(e) to hold the cross section of the wire group WG circular and to prevent leakage of the applied sealant S.

Thereafter, a grommet G can be introduced to and mounted on the waterproofing area of the wire group WG as shown in FIG. 7(f).

According to this embodiment, the sealant S can be applied simultaneously to the opposite sides of the waterproofing area that extends over a plurality of wires W and can penetrate between the wires W by moving the nozzles 22 along the wire alignment direction. Since such a waterproofing treatment is applied when the wire assembly is manufactured, the waterproofing process can be simplified and speeded up. More particularly, the relatively moving mechanism 25 can adjust the spacing between the pair of nozzles 22 to values corresponding to the diameters of the wires W. This enables the clearances between the nozzles and the respective wires W when the nozzles 22 are moved along the alignment of the wires W to vary to a smaller degree. As a result, the sealant S can applied uniformly to the entire opposite sides of the wire group WG in a uniform thickness. Further, wire groups made of wires having different diameters can be accommodated.

The ability of the nozzles 22 to approach the respective wires W enables the clearances between the nozzles 22 and the respective wires W to be reduced substantially to a minimum distance necessary for waterproofing. As a result the sealant consumption can be reduced.

The constructions of the moving mechanism 27, the relatively moving mechanism 25 and the feeding mechanism 26 for realizing the above action and effects are not limited to the above-described embodiments. For instance, the subject waterproofing method may be carried out using other known constructions. Specifically, the sealant may be applied by moving the pair of nozzles 22 opposed to each other at the opposite sides of the aligned wires of the wire group along the wire alignment direction while changing the spacing between the nozzles 22 according to the diameters of the wires.

Since the pair of nozzles 22 hold the wires from the opposite sides by means of the moving mechanism 27 and the relatively moving mechanism 25, they can easily and securely adjust the clearances to minimum values even for flexible wires and the applicator 1 is allowed to have a simple construction. Here, holding of the wires by the nozzles includes holding of the wires with the sealant provided between the nozzles and the wires.

Further, since the wires preferably are aligned substantially according to their diameters, the nozzles 22 are easily accessible to the respective wires. This is because, if a thinner wire is aligned between thicker wires, it may be difficult for the nozzles 22 to approach the thinner wire. Accordingly, variations in the clearances between the nozzles 22 and the wires can be reduced, and the sealant can be applied uniformly. Here, the alignment of wires according to their diameters includes, for example, aligning wires that have only slightly different diameters as if those slight differences did not exist in addition to an alignment of wires from the thickest one to the thinnest one. Thus, with reference to FIG. 8, in some instances, it may not be significant if the three wires in the bottom of the groove 4b have slightly different diameters and are arranged in the bottom section of the groove 4b without concern for the particular order of these three smallest wires W.

The plurality of aligned wires can be positioned easily in the holder 4 because they are aligned according to their diameters. If the wires are positioned in this manner, the clearances between the wires and the nozzles 22 can be reduced. Further, since positioning can be performed easily, it is possible to simplify and speed up the waterproofing treatment.

The sealant applicator according to this embodiment is provided with a controller 6 (see FIG. 6) for controlling the aforementioned parts. The controller 6 includes, for example, a microcomputer (CPU), and controls the respective parts in accordance with a program that is set beforehand. A valve (not shown) for actuating the air-pressure actuators 52 of the relatively moving mechanism 25, the stepping motor 66, the motor 71 of the moving mechanism 27, etc. are connected to the CPU via driving circuits. An input device 7 is connected to the CPU. The input device may be an operation key unit for inputting a kind of wire group held by the holder 4 (for example, an article number of the wire assembly, etc.). The CPU sets various operational parameters in accordance with information inputted from the input device 7. For example, the CPU sets a moving speed and a moving distance of the nozzles 22 by the moving mechanism 27 and a discharging speed and a discharging timing of the sealant from the nozzles 22 by the feeding mechanism 26 to apply the sealant to the wire group held by the holder 4. The CPU then causes the above-described parts to operate based on the set values.

Clearances may exist between the wires of the wire group. For example, two clearances WK are shown in the wire group of FIG. 9. In this situation, the controller 6 controls the pair of nozzles 22 to stop the discharge of the sealant at predetermined timings according to the locations and sizes of the clearances between the wires of the wire group while the nozzles 22 are moved along the wire alignment direction by the moving mechanism 27.

Figure 9:
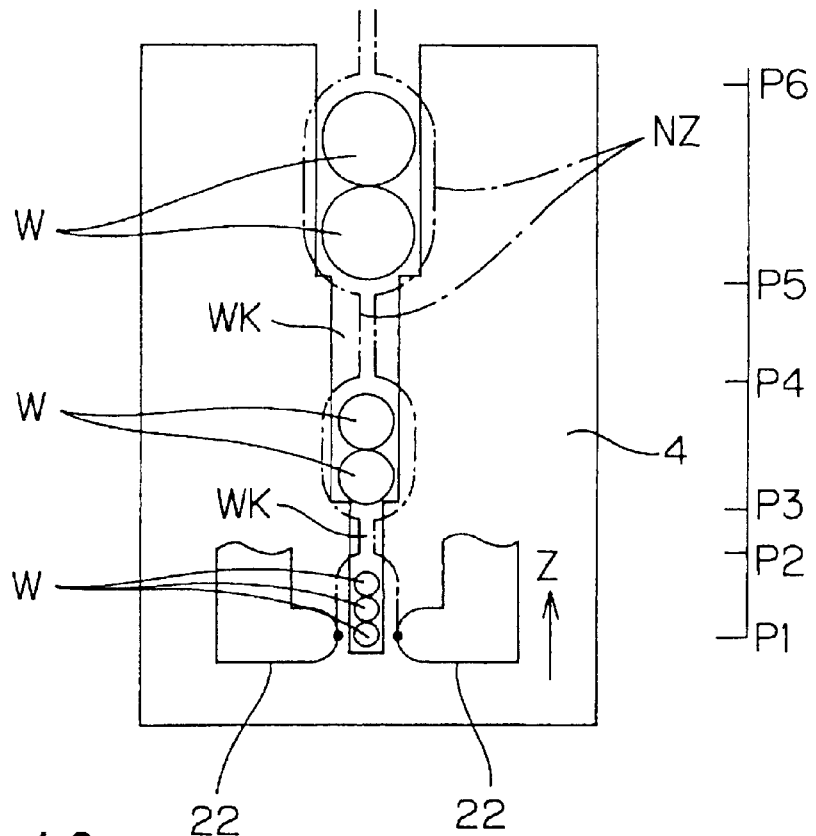
FIG. 9 is a side view showing the holder, the nozzles, the wire group to explain another operation of the sealant applicator shown in FIG. 1.
Figure 10:
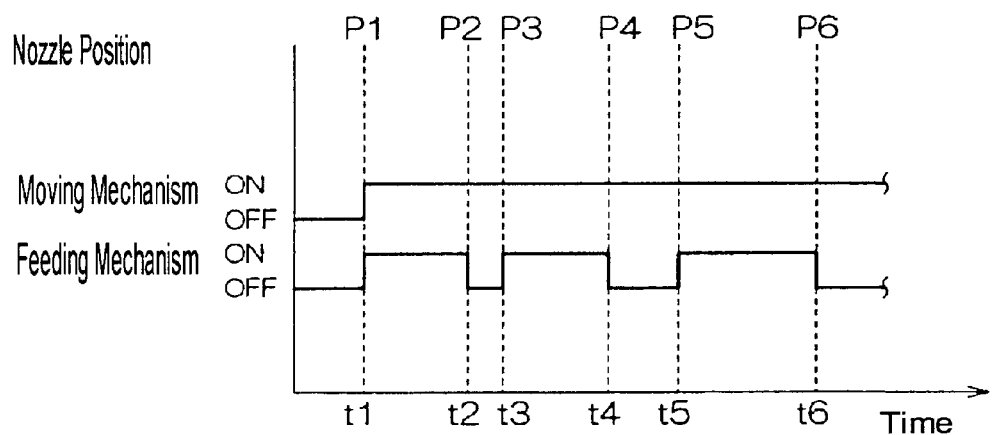
FIG. 10 is a timing chart of the operation shown in FIG. 9.

Next, reference is made to FIG. 9 and a timing chart of FIG. 10. Here, operations corresponding to FIGS. 8(c) and 8(d) are described. In FIGS. 9 and 10, the positions of the nozzles 22 along the wire alignment direction Z are shown by P1 to P6.

The controller 6 prejudges whether or not there is any clearance between the wires when the wire group WG is held by the holder 4 based on the information from the input device 7.

The discharge of the sealant is started by the feeding mechanism 26 when the nozzles 22 are located to face the bottom end of the wire group and the spacing between the nozzles 22 is narrowed (state shown in FIG. 9). Simultaneously, the moving mechanism 27 starts moving the nozzles 22 along the alignment direction Z of the wires W of the wire group WG at a constant speed (timing t1, position P1).

After a predetermined time from the start of the movement, the nozzles 22 reach time t2 and position P2, which corresponds to an area where the lower clearance WK between the wires exists. Thus the controller 6 stops the discharge of the sealant. Both nozzles 22 similarly are moved along the wire alignment direction by the moving mechanism 27, so that they move closer to each other when they reach the clearance WK (traces of movement NZ of the nozzles 22 are shown in FIG. 9).

Upon reaching timing t3, the nozzles 22 face the wire W and the discharge of the sealant S is resumed (position P3). Hereafter, the discharge or application of the sealant S is stopped again when the nozzles 22 are located in the area where there is a clearance WK between the wires W, and the sealant S is discharged while the nozzles 22 again face the wire W.

As explained above, the discharge of the sealant S is stopped whenever the nozzles 22 face a clearance WK between two pluralities of wires W. Consequently, a wasteful consumption of the sealant S can be prevented, thereby reducing an amount of the sealant S used. Further, since the opposed nozzles 22 are closer to each other at the clearance WK, the sealant S can be applied securely to wires W adjacent to the clearance WK at a short distance.

Figure 11:
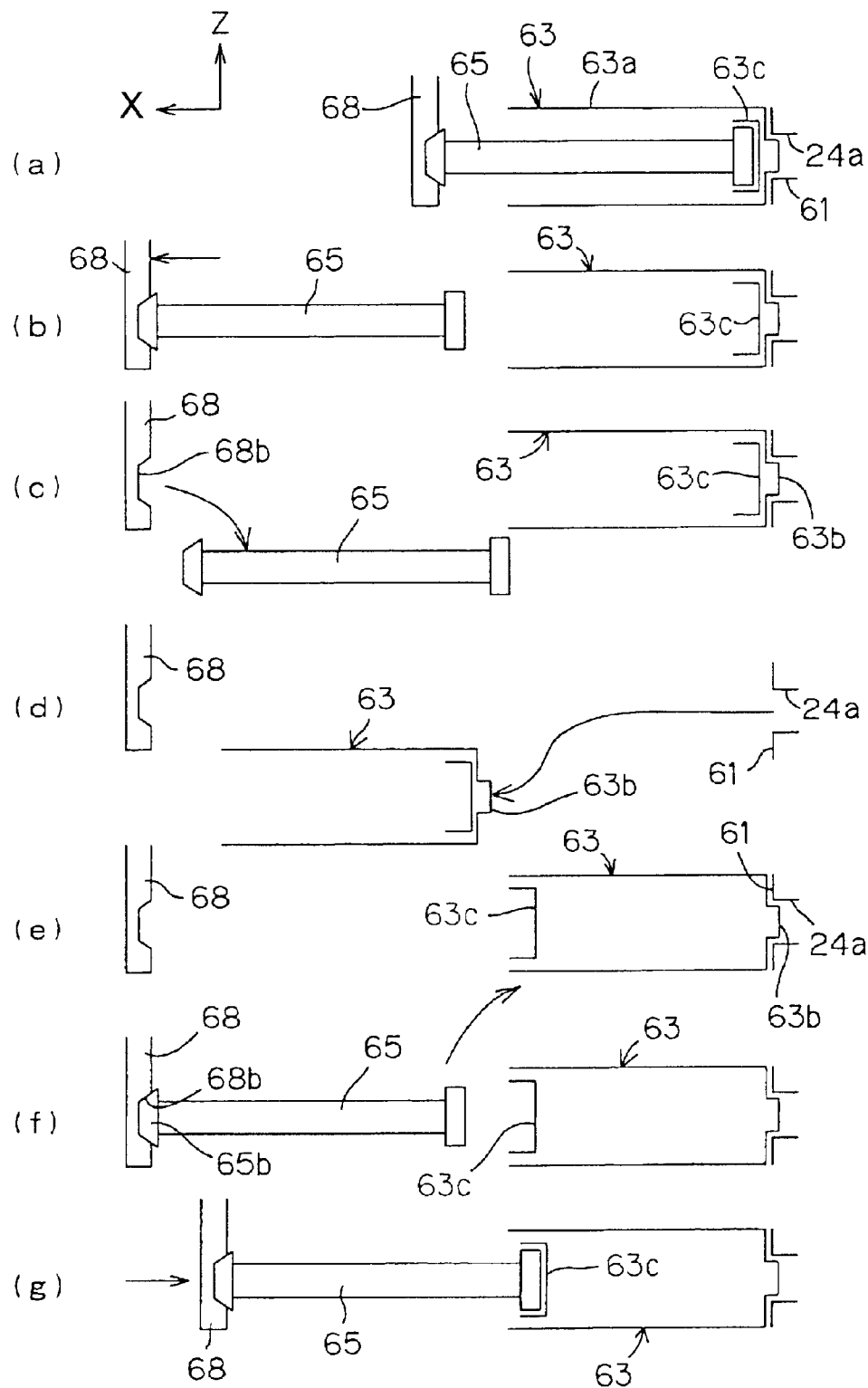
FIGS. 11(a) to 11(g) are diagrams showing a cartridge exchanging operation in the sealant applicator shown in FIG. 1.

An exchange of an empty cartridge 63 with a full one is described next with reference to FIG. 11. Although only one cartridge 63 is described below, a pair of cartridges 63 may be used in the sealant applicator 1 according to this embodiment and are exchanged simultaneously.

First, the emptied cartridge 63 is detached from the mount portion 61, as shown in FIG. 11(a). Specifically, the coupling member 68 is moved from the first position to the second position as shown in FIG. 11(b), and the pushing bar 65 is detached from the recess 68b of the coupling member 68. At this time, even if the one end 65a of the pushing bar 65 is located in the tube 63a of the cartridge 63, the pushing bar 65 can be taken out easily by laying the other end 65b of the pushing bar 65 along the slanted surface. With the pushing bar 65 detached, the small-diameter portion 63b of the cartridge 63 is detached from the mount portion 61 as shown in FIG. 11(d). The cartridge 63 then is moved along its longitudinal direction and can be taken out in a space between the cartridge 63 and the coupling member 68 to permit the attachment and detachment.

Next, a new cartridge 63 is prepared. Specifically, a seal film for sealing an outlet of the cartridge 63 is removed, and then the bottom lid 63c of the cartridge 63 is positioned in a specified position in the tube 63a. The bottom lid 63c then is pushed slightly to discharge a tiny amount of the sealant from the outlet of the cartridge 63. The discharged sealant is shaped to have an even surface at the outlet to prevent air from being located between the outlet and the sealant already in the hole 24a when the cartridge 63 is attached to the mount portion 61.

The cartridge 63 thus prepared is attached. The small-diameter portion 63b of the prepared cartridge 63 is located to face the mount portion 61 in the above space, thereby permitting the attachment and detachment of the cartridge 63. Next, the cartridge 63 is moved toward the mount portion 61 along its longitudinal direction to be mounted.

The pushing bar 65 is arranged in the recess 68b of the coupling member 68, as shown in FIG. 11(f), after the cartridge 63 is attached, and is held in the recess 68b by the magnetic attraction of the permanent magnet 69. The coupling member 68 then is moved toward the mount portion 61 to bring the pushing bar 65 into contact with the bottom lid 63c of the cartridge 63. The coupling member 68 then is moved further in the same direction until the sealant is discharged from the nozzles 22, as shown in FIG. 11(g). Thus, the exchange of the cartridge 63 is completed, and an applying operation can be resumed.

Since the pushing bar 65 can be detached from the coupling member 68 when the cartridge 63 is attached or detached, the cartridge 63 can be attached and detached easily without interference with the pushing bar 65.

Further, by detaching the pushing bar 65 when the cartridge 63 is to be attached or detached, the space for installing the pushing bar 65 can be used for attaching and detaching the cartridge 63. Hence, the moving distance of the coupling member 68 can be shortened. As a result, not only the feeding mechanism 26, but also the sealant applicator 1 can be made smaller.

Use of the magnetic attraction of the permanent magnet 69 to hold the pushing bar 65, enables the pushing bar 65 to be attached and detached easily only by arranging the other end 65b of the pushing bar 65 at the coupling member 68.

Although the sealant is applied uniformly in the waterproofing or application area in the foregoing embodiment, an applied amount of the sealant may be made to differ locally. For instance, the applied amount of the sealant may be increased in a portion where the thicker wires are aligned. This may be realized by slowing down the moving speed of the nozzles 22 and/or by increasing the discharging speed of the sealant.

Accordingly, since the nozzles are moved in the wire alignment direction while the spacing between the nozzles is adjusted according to the diameters of the wires, wire groups made of wires having different diameters can be accommodated and the sealant can be applied uniformly. Further, such a construction is preferable to simplify and speed up the waterproofing treatment.

Moreover, these effects can be obtained for the aligned wires.

Furthermore, the sealant applicator is allowed to have a simple construction and is applicable to flexible wires since it comprises the pair of nozzles for holding the wires in contact therewith. Further, the sealant can be applied securely and uniformly by aligning the wires in the order of their diameters.

Preferably, if there is a clearance between the aligned wires, a wasteful consumption of the sealant, which could have been discharged at the clearance can be prevented, thereby reducing an amount of the sealant used.

Advantageously, by detaching the pushing bar for pushing the bottom lid of the cartridge and the movable member for moving the pushing bar, the cartridge can be attached and detached easily without interference by the pushing bar. Further, the pushing bar can also easily be attached and detached by utilizing the magnetic attraction of the permanent magnet for holding the pushing bar by the movable member.

What is claimed is:

1. An application method for applying a material to wires of a wire group, each of said wires have a diameter, comprising the steps of:

aligning wires of a wire group substantially in a wire aligning direction;

providing a pair of nozzles for discharging the material;

positioning the nozzles substantially opposed to each other with the wires of the aligned wire group therebetween; and moving the nozzles in the wire alignment direction while changing a spacing between the pair of nozzles according to the diameters of the wires so as to cause the material to coat the wires uniformly and with a specified thickness.

2. An application method according to claim 1, wherein the aligning of the wires comprises aligning the wires substantially according to the respective diameters, such that the diameters of the wires increases in the wire alignment direction.

3. An application method according to claim 2, wherein the moving of the nozzles comprises reducing a space between the nozzles when the nozzles reach a position along the wire alignment direction corresponding to a clearance between adjacent wires.

4. An application method according to claim 3, further comprising the step of reducing an application rate of the material through the nozzles when the nozzles reach the position along the wire alignment direction corresponding to the clearance between adjacent wires.

5. An application method according to claim 1, wherein the discharge of material is changed by varying the moving speed of the nozzles along the wire alignment direction.

6. An application method according to claim 1, wherein the discharge of material is changed by varying the discharge speed of the material.

7. An application method according to claim 1, wherein the method is used as a waterproofing method for a wire group to be introduced into a grommet, the material comprising a sealant, the method further comprising wrapping a film around the wire group such that the wrapped wire group has a substantially circular cross section and taping the outer surface of the film.

* * * * *